(12) United States Patent
Lee et al.

(10) Patent No.: US 11,955,609 B2
(45) Date of Patent: Apr. 9, 2024

(54) SECONDARY BATTERY ACTIVATION METHOD

(71) Applicant: LG ENERGY SOLUTION, LTD., Seoul (KR)

(72) Inventors: Jung Hoon Lee, Daejeon (KR); Chul Haeng Lee, Daejeon (KR); Yoo Sun Kang, Daejeon (KR); Sol Ji Park, Daejeon (KR); Jae Won Lee, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 0 days.

(21) Appl. No.: 18/036,059

(22) PCT Filed: Sep. 6, 2022

(86) PCT No.: PCT/KR2022/013324
§ 371 (c)(1),
(2) Date: May 9, 2023

(87) PCT Pub. No.: WO2023/038388
PCT Pub. Date: Mar. 16, 2023

(65) Prior Publication Data
US 2023/0395882 A1 Dec. 7, 2023

(30) Foreign Application Priority Data
Sep. 10, 2021 (KR) .................. 10-2021-0121099

(51) Int. Cl.
*H01M 10/44* (2006.01)
*H01M 10/42* (2006.01)

(52) U.S. Cl.
CPC ....... *H01M 10/44* (2013.01); *H01M 10/4235* (2013.01)

(58) Field of Classification Search
CPC .................. H01M 10/44; H01M 10/4235
See application file for complete search history.

(56) References Cited

U.S. PATENT DOCUMENTS

| | | | |
|---|---|---|---|
| 2009/0142663 A1 | 6/2009 | Takeuchi et al. | |
| 2012/0141869 A1 | 6/2012 | Takahata | |

(Continued)

FOREIGN PATENT DOCUMENTS

| | | | |
|---|---|---|---|
| CN | 112310473 A | * | 2/2021 |
| JP | WO2014/141930 A1 | | 9/2014 |

(Continued)

OTHER PUBLICATIONS

Han et al., Calculated Reduction Potentials of Electrolyte Species in Lithium-Sulfur Batteries, Aug. 2020, J. Phys. Chem. C., 124, 20654-20670 (Year: 2020).*

(Continued)

*Primary Examiner* — Daniel S Gatewood
(74) *Attorney, Agent, or Firm* — Birch, Stewart, Kolasch & Birch, LLP

(57) ABSTRACT

A method of activating a secondary battery includes an operation of deriving a reduction reaction voltage according to an electrolyte additive, a pre-charging operation of pre-charging the secondary battery into which an electrolyte containing the electrolyte additive is injected, and a pre-aging operation of wetting an electrode assembly accommodated in the secondary battery with the injected electrolyte and aging the electrode assembly. A charging termination voltage in the pre-charging operation is less than the reduction reaction voltage.

10 Claims, 5 Drawing Sheets

(56) References Cited

U.S. PATENT DOCUMENTS

| | | | |
|---|---|---|---|
| 2014/0322579 A1 | 10/2014 | Mitsuhashi et al. |
| 2015/0004474 A1 | 1/2015 | Lee et al. |
| 2015/0380777 A1 | 12/2015 | Takahashi et al. |
| 2016/0006076 A1 | 1/2016 | Kim et al. |

FOREIGN PATENT DOCUMENTS

| | | | |
|---|---|---|---|
| JP | 2015-170520 A | | 9/2015 |
| JP | 2015170520 A | * | 9/2015 |
| JP | 2017-103024 A | | 6/2017 |
| JP | 2017-152223 A | | 8/2017 |
| JP | 6981208 B2 | | 12/2021 |
| KR | 10-2008-0031151 A | | 4/2008 |
| KR | 10-1364828 B1 | | 2/2014 |
| KR | 10-2014-0098152 A | | 8/2014 |
| KR | 10-2015-0004271 A | | 1/2015 |
| KR | 10-2015-0031018 A | | 3/2015 |
| KR | 10-2016-0004665 A | | 1/2016 |
| KR | 10-1617415 B1 | | 5/2016 |
| KR | 10-2017-0110434 A | | 10/2017 |
| KR | 10-2020-0084510 A | | 7/2020 |
| KR | 10-2186402 B1 | | 12/2020 |
| KR | 20210030000 A | * | 3/2021 |

OTHER PUBLICATIONS

International Search Report (PCT/ISA/210) issued in PCT/KR2022/013324, dated Jan. 9, 2023.

* cited by examiner

[FIG. 1]
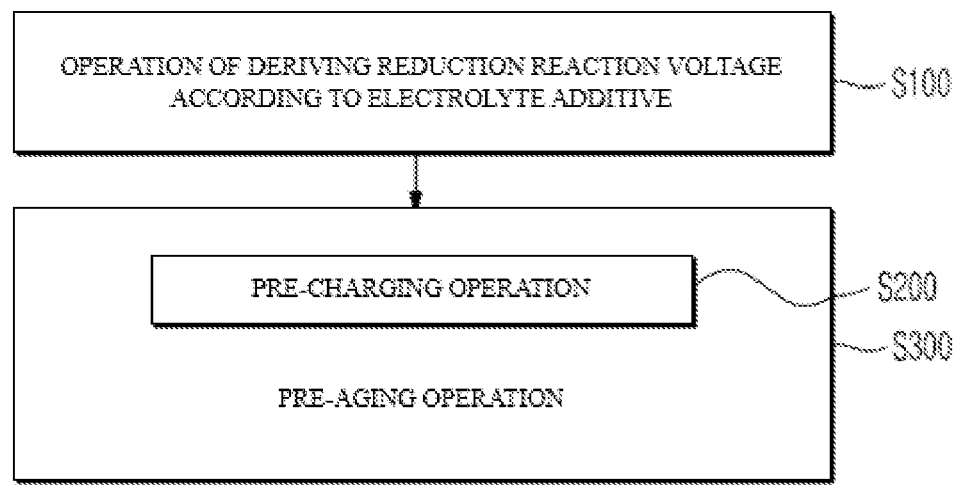

[FIG. 2]
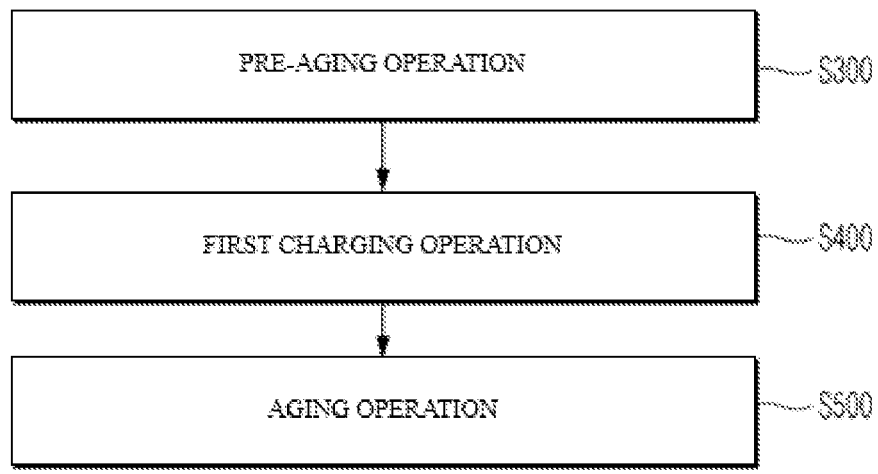

[FIG. 3]
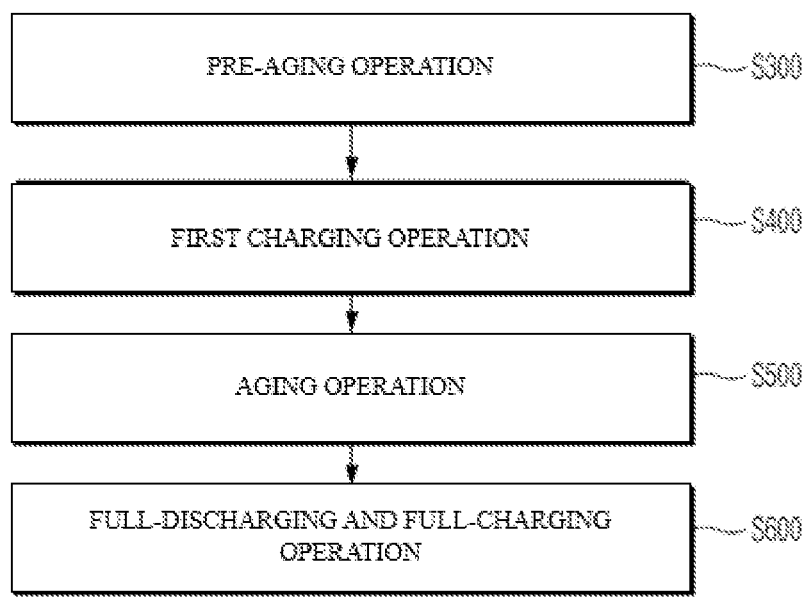

[FIG. 4]
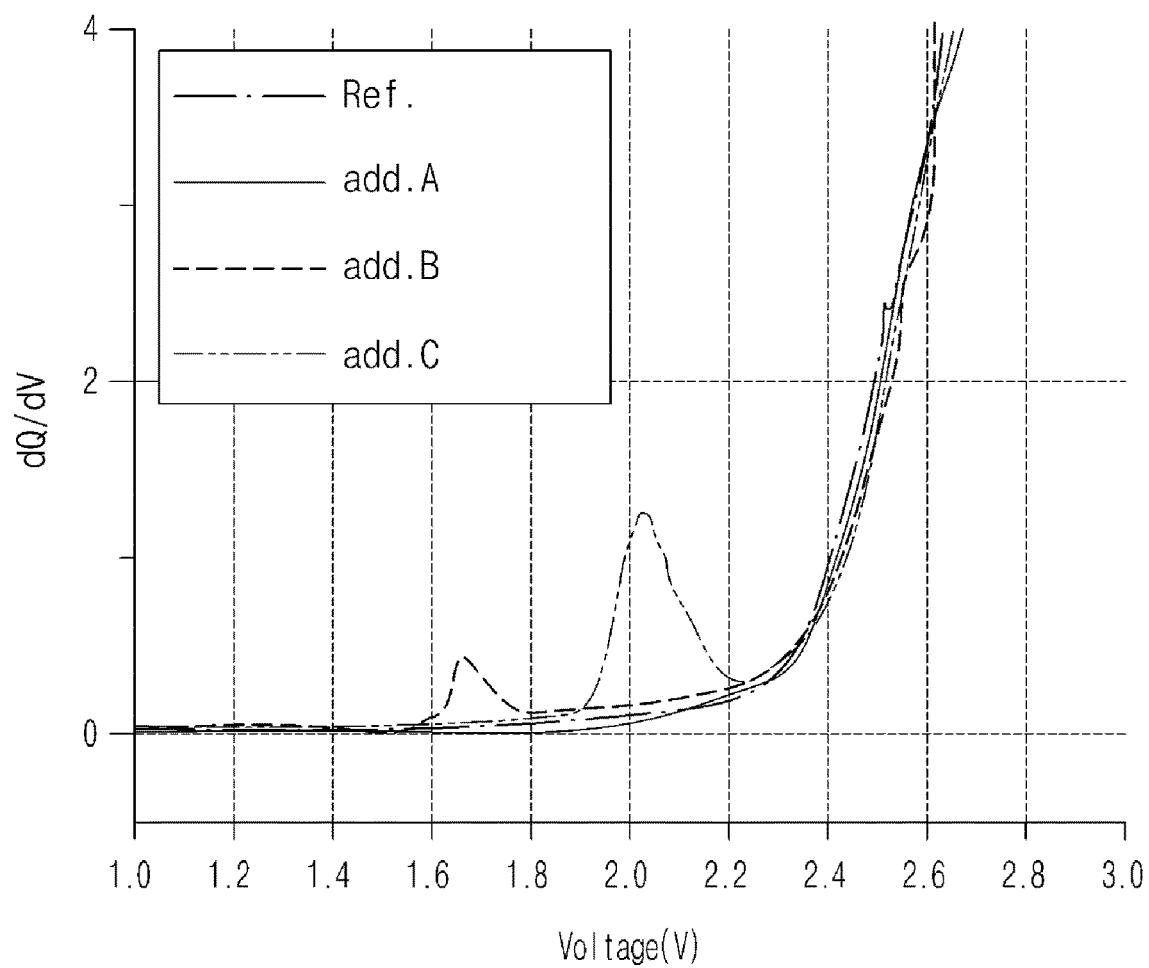

[FIG. 5]
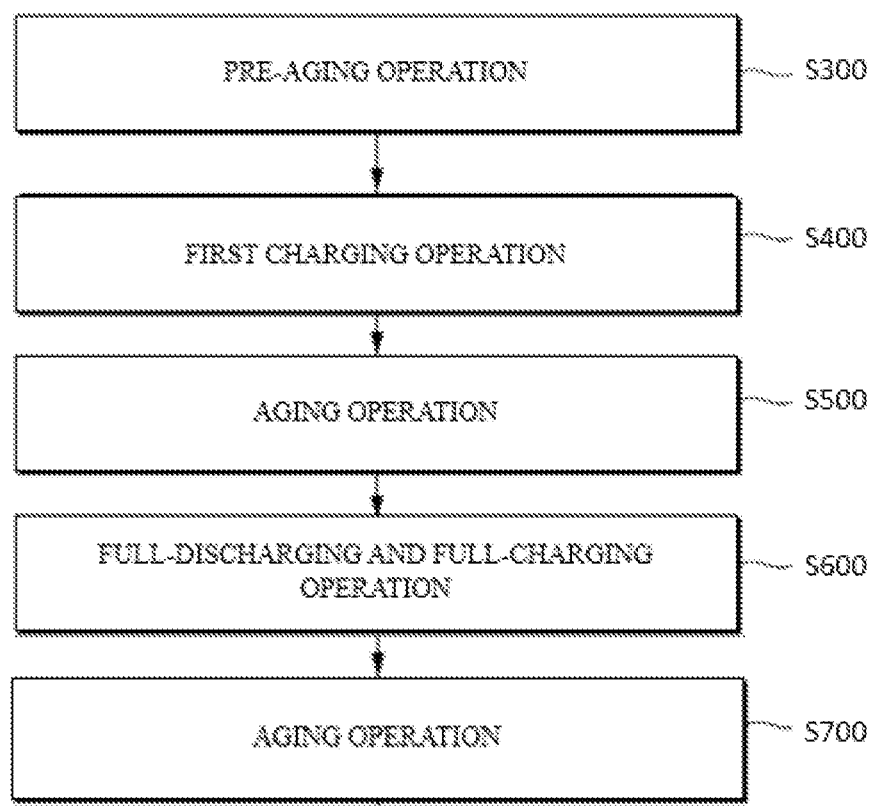

SECONDARY BATTERY ACTIVATION METHOD

TECHNICAL FIELD

This application claims the benefit of priority based on Korean Patent Application No. 10-2021-0121099, filed on Sep. 10, 2021, and the entire contents of the Korean patent application are incorporated herein by reference.

The present invention relates to a method of activating a secondary battery, and more specifically, to a method of activating a secondary battery, which is capable of, in lowering a potential of a negative electrode through pre-charging before wetting, lowering only the potential of the negative electrode while suppressing a negative electrode reaction of some additives contained in an electrolyte.

BACKGROUND ART

Generally, secondary batteries are batteries that can be charged or discharged, unlike primary batteries that cannot be charged, and are widely used in electronic devices such as mobile phones, notebook computers, computers, camcorders, etc. or electric vehicles. In particular, lithium secondary batteries have a larger capacity than nickel-cadmium batteries or nickel-hydrogen batteries and have a high energy density per unit weight, and thus the degree of utilization of lithium secondary batteries is rapidly increasing.

In such lithium secondary batteries, a lithium-based oxide and a carbon material are mainly used as a positive electrode active material and a negative electrode active material, respectively. A lithium secondary battery includes an electrode assembly in which a positive electrode plate and a negative electrode plate to which a positive electrode active material and a negative electrode active material are applied, respectively, are disposed with a separator interposed therebetween, and a cladding material that seals and accommodates the electrode assembly together with an electrolyte.

Meanwhile, the lithium secondary batteries are classified as can-type secondary batteries in which an electrode assembly is embedded in a metal can, and pouch-type secondary batteries in which an electrode assembly is embedded in a pouch of an aluminum laminate sheet, according to a shape of a battery case.

Generally, secondary batteries are manufactured through a process in which an electrolyte in a liquid state, that is, an electrolyte, is injected in a state in which an electrode assembly is accommodated in a battery case, and the battery case is sealed.

Such lithium secondary batteries may have various types of defects due to various causes during a manufacturing process or use. In particular, some secondary batteries that have been manufactured exhibit voltage drops by a self-discharging rate or more, and such a phenomenon is referred to as a low voltage failure phenomenon.

The low voltage failure phenomenon of the secondary battery is typically caused by metal foreign substances positioned inside the secondary battery. In particular, when a metal foreign substance such as iron or copper is present on a positive electrode plate of the secondary battery, the metal foreign substance may grow as a dendrite in a negative electrode. In addition, such a dendrite may cause an internal short circuit of the secondary battery, which may cause failure or damage to the secondary battery, or, in severe cases, ignition.

In order to solve the above problems, various attempts have been made, and one of the attempts is pre-charging, which is a process of lowering a potential of a negative electrode by proceeding with charging after injecting the electrolyte before wetting with the electrolyte, as a representative method. The potential of the negative electrode before charging proceeds is greater than or equal to 3 V, which is a reduction potential of Li, and corresponds to a higher potential than iron having a reduction potential of 2.59 V and nickel having a reduction potential of 2.78 V inside a cell. After the electrolyte is injected, the electrolyte gradually wets the inside of pores of an electrode. In this case, a foreign substance or Cu may be oxidized and eluted. Accordingly, by performing the pre-charging process when the wetting with the electrolyte is completed after the electrolyte is injected, the potential of the negative electrode may be lowered to prevent the elution of foreign substances or metals such as Cu and the like.

However, since the pre-charging starts and proceeds before the electrolyte sufficiently wets the inside of the pores of the electrode, some additives contained in the electrolyte may cause a reduction reaction on a surface of the negative electrode during the pre-charging to form a non-uniform film on the surface of the negative electrode, and thus the lifetime characteristics of the battery may be lowered due to the formation of the non-uniform film. Therefore, it is necessary to develop a technique for suppressing a reaction of an additive contained in an electrolyte during pre-charging.

DISCLOSURE

Technical Problem

An object of the present invention is to provide a technique for lowering only a potential of a negative electrode current collector while suppressing a film from being formed by an additive reacting on a surface of a negative electrode when pre-charging is performed before wetting of a secondary battery.

Technical Solution

The present invention is directed to solving the above-described problem and is providing a method of activating a secondary battery, which includes an operation of deriving a reduction reaction voltage according to an electrolyte additive, a pre-charging operation of pre-charging the secondary battery into which an electrolyte containing the electrolyte additive is injected, and a pre-aging operation of wetting an electrode assembly accommodated in the secondary battery with the injected electrolyte and aging the electrode assembly to provide a pre-aged secondary battery, wherein a charging termination voltage in the pre-charging operation is less than the reduction reaction voltage.

The reduction reaction voltage may be a voltage at an onset point at which a reduction reaction starts in a dQ/dV graph obtained by differentiating a voltage-capacity profile during first charging of the secondary battery into which the electrolyte containing the electrolyte additive is injected.

The charging termination voltage in the pre-charging operation may be set within a range of 70% to 99% of the reduction reaction voltage.

The pre-charging operation may start within 3 hours after the injection of the electrolyte.

The pre-charging operation may be performed using a constant current charging method.

In the pre-charging operation, the secondary battery may be charged at a C-rate of 0.01 to 0.5.

The method may further include, after the pre-aging operation is performed, a first charging operation of charging the pre-aged secondary battery to provide a first charged secondary battery, and an aging operation of aging the first charged secondary battery to provide an aged, first charged secondary battery.

In the first charging operation, the pre-aged secondary battery may be charged while being pressurized.

The method may further include, after the aging operation, a full-discharging and full-charging operation of fully discharging and fully charging the aged, first charged secondary battery.

The method may further include, after the full-discharging and full-charging operation is performed, an additional aging operation of aging the aged, first charged secondary battery.

Advantageous Effects

According to a method of activating the secondary battery of the present invention, while suppressing a negative electrode reaction of an electrolyte additive, a potential of a negative electrode can be lowered to prevent a low voltage failure and to form a solid electrolyte interface (SEI) film uniformly.

BRIEF DESCRIPTION OF THE DRAWINGS

FIGS. 1 to 3 are flowcharts of methods of activating a secondary battery according to embodiments of the present invention.

FIG. 4 is a dQ/dV graph obtained by differentiating a voltage-capacity profile during first charging of a secondary battery for each type of additive.

FIG. 5 is a flowchart of a method of activating a secondary battery according to an embodiment of the present invention.

DETAILED DESCRIPTION OF THE PREFERRED EMBODIMENTS

Hereinafter, exemplary embodiments of the present invention will be described in detail with reference to the accompanying drawings. Prior to this, terms and words used in this specification and claims should not be interpreted as being limited to commonly used meanings or meanings in dictionaries and should be interpreted with meanings and concepts which are consistent with the technological scope of the present invention based on the principle that the inventors have appropriately defined concepts of terms in order to describe the present invention in the best way.

Therefore, since the embodiments described in this specification and configurations illustrated in the drawings are only exemplary embodiments and do not represent the overall technological scope of the present invention, it is understood that the present invention covers various equivalents, modifications, and substitutions at the time of filing of this application.

FIG. 1 is a flowchart of a method of activating a secondary battery according to an embodiment of the present invention. Referring to FIG. 1, the method of activating the secondary battery according to the embodiment of the present invention includes an operation S100 of deriving a reduction reaction voltage according to an electrolyte additive, a pre-charging operation S200 of pre-charging the secondary battery into which an electrolyte containing the electrolyte additive is injected, and a pre-aging operation S300 of wetting an electrode assembly accommodated in the secondary battery with the injected electrolyte and aging the electrode assembly.

Generally, when the assembly of the secondary battery is completed, an activation process including processes such as charging, aging, discharging, and the like of the assembled battery is performed so that the structure of the battery is stabilize and usable. Prior to initiation of the activation process, a pre-aging operation of stabilizing the secondary battery into which the electrolyte is injected by being left at room temperature for a certain period of time is preferentially performed so that the electrolyte injected into the secondary battery sufficiently wets the inside of the electrode assembly.

Referring to FIG. 1, after the electrolyte is injected into the secondary battery, the pre-aging operation of wetting the electrode assembly with the electrolyte. As described above, in order to suppress the low voltage failure caused by the elution of foreign substances or metals, a technique in which the pre-charging operation S200 of charging the secondary battery at a predetermined charging rate is performed after the electrolyte is injected and before the pre-aging operation S300 is completed.

The introduction of the pre-charging operation has an advantage that a potential of a negative electrode may be lowered while the electrolyte wets the electrode, and thus it is possible to prevent the metal from being oxidized and eluted, thereby suppressing the low voltage failure. However, the inventors of the present invention found that in the pre-charging operation, when charging state of charge (SOC) is high, components of some additives contained in the electrolyte are reduced and decomposed to form a non-uniform film on the negative electrode and, in the case of a high-loading electrode, such a non-uniformity may be further aggravated, and came to the present invention to propose a pre-charging method capable of lowering only the potential of the negative electrode while suppressing the negative electrode reaction of the electrolyte additive.

Various types of additives are included in the electrolyte in order to improve the ionic conductivity of the electrolyte and lifetime or safety of the battery. These additives may be divided into solid electrolyte interface (SEI) forming/controlling agents on a surface of a negative electrode, overcharge inhibitors in secondary batteries, electrolyte ion conductivity improving agents, flame retardants, etc., according to their functions. These additives have different reduction potentials that react on the surface of the negative electrode.

Therefore, in the present invention, after a reduction reaction voltage is derived according to a type of the electrolyte additive, in the pre-charging operation, by setting a charging termination voltage to be less than the reduction reaction voltage to induce a reductive decomposition reaction of the additive to proceed after wetting with the electrolyte, a uniform SEI film can be formed, and by lowering the potential of the negative electrode before the wetting with the electrolyte, the low voltage failure can be suppressed.

<Reduction Reaction Voltage Derivation Operation According to Additive>

The operation S100 of deriving the reduction reaction voltage according to the electrolyte additive is an operation of deriving the reduction reaction voltage of the secondary battery according to the electrolyte additive, which is a reference of the charging termination voltage, in order to set the charging termination voltage in the pre-charging operation. Since aspects of the reductive decomposition reaction and the reductive decomposition voltage are different according to the type of additive, an appropriate reference of the charge termination voltage in the pre-charging operation may be derived through the operation of deriving the reduction reaction voltage of the present invention.

In one specific example, the reduction reaction voltage of the additive may be defined as a voltage at an onset point at which a reduction reaction of the electrolyte starts in a dQ/dV graph obtained by differentiating a voltage-capacity profile during first charging of the secondary battery including the electrolyte additive.

FIG. 4 is a dQ/dV graph obtained by differentiating the voltage-capacity profile during the first charging of the secondary battery according to the type of the additive according to the embodiment of the present invention (Ref. denotes a control group that does not include an additive). Referring to FIG. 4, it shows that a shape of the dQ/dV graph varies according to the type of the additive, no peak is observed for dQ/dV of an additive A, and a peak is observed for each dQ/dV of an additive B and an additive C. Here, the peak is a changing point at which a slope of dQ/dV rapidly increases and then rapidly decreases, and the onset point may be defined as a point at which the slope of dQ/dV starts to increase. Specifically, as illustrated in FIG. 4, an onset point of the additive B is observed around about 1.5 V, and an onset point of the additive C is observed around about 1.9 V. Therefore, a charging termination voltage of pre-charging of the battery including the additive B may be set based on 1.5 V, and a charging termination voltage of pre-charging of the battery including the additive B may be set based on 1.9 V.

The charging method for obtaining the voltage-capacity profile may be performed according to a known method, and in one specific example, the secondary battery including the corresponding electrolyte additive serving as an electrolyte is charged up to SOC 40% under a charging condition of 0.1 C-rate within a driving voltage range of 1.0 to 2.7 V at room temperature (23° C.), and the voltage-capacity profile may be obtained by observing a change in capacity according to voltage, but the present invention is not limited thereto.

Further, in one specific example, the secondary battery may be a full-cell type secondary battery.

<Pre-Charging Operation>

The pre-charging operation S200 of the present invention is an operation of performing charging after injecting the electrolyte and before wetting with the electrolyte in order to lower the potential of the negative electrode to prevent metal elution. In the present invention, the charging termination voltage in the pre-charging operation is set to be less than the reduction reaction voltage of the electrolyte additive.

In the pre-charging operation, when charging is performed after setting the charging termination voltage to a voltage exceeding the reaction voltage of the additive, some additives are reductively decomposed to form a non-uniform film on the surface of the negative electrode. In the present invention, by setting the charging termination voltage in the pre-charging operation to be less than the reduction reaction voltage of the additive, the reductive decomposition reaction of the additive proceeds after the wetting with the electrolyte to form a uniform SEI film, and thus lifetime characteristics can be improved.

In one specific example, the charging termination voltage in the pre-charging operation may be set within a numerical range of 70 to 99% of the reduction reaction voltage of the electrolyte additive and more preferably within a numerical range of 75% to 95%. When the charging termination voltage is too high, it is not preferable because there is a possibility that the electrolyte additive is reductively decomposed, and when the end-of-charge voltage is too low, it is not preferable because it is not sufficient to lower the potential of the negative electrode, and thus the above numerical ranges are preferable.

The pre-charging operation of the present invention starts after the injection of the electrolyte. Immediately after the injection of the electrolyte, the electrolyte may gradually move into the electrode assembly and the reductive decomposition reaction of the electrolyte additive may proceed, and thus it is more preferable that a time interval between a time point at which the injection of the electrolyte starts and a time point at which the pre-charging operation starts be short. In one specific example, the pre-charging operation may be performed within 6 hours after the injection of the electrolyte, more preferably, may be performed within 3 hours after the injection of the electrolyte, and most ideally, may be performed immediately after the injection of the electrolyte.

The charging method in the pre-charging operation of the present invention may be performed by a constant current (CC) charging method or a constant current-constant voltage (CC-CV) charging method for charging a battery with a constant current. Since the pre-charging operation of the present invention has the purpose of lowering the potential of the negative electrode, a CC charging method for charging with a constant current is basically suitable, but in some cases, when an overcurrent flows through the battery, a constant voltage (CV) charging method may be supplementarily employed to control the current.

In this case, the charging rate of the pre-charging operation may be appropriately set in consideration of the desired required time of the pre-charging operation, and specifically, the C-rate may range from 0.01 to 0.5, preferably, 0.02 to 0.4, and more preferably, 0.03 to 0.3, but the present invention is not limited thereto. When the charging rate is low, the potential of the negative electrode may be stably lowered, but the time required for the pre-charging becomes longer and the additive may be reduced and decomposed before the wetting. Therefore, it is not preferable that the charging rate is too low, and conversely, when the charging rate is too high, the potential of the negative electrode is suddenly lowered, and thus side effects may occur.

<Pre-Aging Operation>

The pre-aging operation S300 is an operation of aging the battery so that the electrolyte sufficiently wets the electrode assembly after the battery is assembled.

More specifically, when the secondary battery is charged, electrons are moved to a negative electrode along a conductive wire and are charged, and lithium ions are occluded in the negative electrode to achieve charge neutrality. In this case, the lithium ions may be occluded in a region that the electrolyte sufficiently wets, that is, in a region (wetting area) in which a movement path through which the ions are moved is maintained, but the lithium ions are relatively difficult to be occluded in a region (non-wetting area) that the electrolyte does not wet. Therefore, through the pre-aging operation, the battery may be aged in an environment having constant humidity and temperature conditions so that the electrolyte may permeate the positive electrode and the negative electrode well.

After the pre-aging operation is performed, a series of activation processes including a first charging operation of charging the secondary battery at a predetermined charging depth and an aging operation of aging the charged battery are performed in earnest, and in the present invention, all of the series of processes including the pre-aging process will be described as being included in the concept of the activation process.

In one specific example, a required time of the pre-aging process may range from, specifically, 3 hours to 72 hours, 6 hours to 60 hours, or 12 hours to 48 hours, and may be appropriately adjusted according to the materials of the positive electrode, the negative electrode, and the electrolyte, the design capacity of the secondary battery, and the like. Further, the pre-aging process may be performed at room temperature that is in the range of 20° C. to 30° C., specifically, 22° C. to 28° C., more specifically, 23° C. to 27° C., and furthermore specifically, 25° C. to 27° C., but the present invention is not limited thereto, and the temperature may be appropriately changed according to the characteristics of the battery.

The activation process of the present invention is performed on the lithium secondary battery. Such a lithium secondary battery is assembled through the following process, and then undergoes the pre-aging operation.

An electrode mixture including an electrode active material and a binder is applied to an electrode current collector to manufacture a positive electrode and a negative electrode, and then a separator is interposed between the positive electrode and the negative electrode to manufacture an electrode assembly.

The electrode assembly manufactured in this way is accommodated in a battery case, then an electrolyte is injected, and the battery case is sealed to assemble the battery.

Such an operation of assembling the battery is not particularly limited and may be performed according to a known method.

Further the electrode assembly is not particularly limited as long as it has a structure including a positive electrode, a negative electrode, and a separator interposed between the positive electrode and the negative electrode, and may be, for example, a jelly-roll type electrode assembly, a stack type electrode assembly, a stack/folding type electrode assembly, or the like.

The battery case is not particularly limited as long as it is used as a cladding material for battery packaging, and a cylindrical battery case, a prismatic battery case, or a pouch type battery case may be used.

The electrolyte may include an organic solvent, lithium salts, and an additive.

The organic solvent is not particularly limited as long as decomposition due to an oxidation reaction or the like can be minimized during charging or discharging of the battery, and may be, for example, a cyclic carbonate, a linear carbonate, an ester, an ether, or a ketone. The above materials may be used alone, or two or more materials may be used in combination.

Among the organic solvents, in particular, a carbonate-based organic solvent may be preferably used. Representative examples of the cyclic carbonate may include ethylene carbonate (EC), propylene carbonate (PC), and butylene carbonate (BC), and representative examples of the linear carbonate may include dimethyl carbonate (DMC), diethyl carbonate (DEC), dipropyl carbonate (DPC), ethylmethyl carbonate (EMC), methylpropyl carbonate (MPC), and ethylpropyl carbonate (EPC).

Examples of the lithium salts may include lithium salts such as $LiPF_6$, $LiAsF_6$, $LiCF_3SO_3$, $LiN(CF_3SO_2)_2$, $LiBF_4$, $LiBF_6$, $LiSbF_6$, $LiN(C_2F_5SO_2)_2$, $LiAlO_4$, $LiAlCl_4$, $LiSO_3CF_3$, $LiClO_4$, and the like that are commonly used in electrolytes of lithium secondary batteries without restrictions, and these materials may be used alone, or two or more materials may be used in combination.

Further, the electrolyte further includes an additive, and examples of the additive may include any one selected from the group consisting of vinylene carbonate, vinylethylene carbonate, fluoroethylene carbonate, cyclic sulfite, saturated sultone, unsaturated sultone, acyclic sulfone, lithium oxalyldifluoroborate (LiODFB), and derivatives thereof, or a mixture of two or more thereof in order to stably form an SEI film, but the present invention is not limited thereto.

Examples of the cyclic sulfite may include ethylene sulfite, methyl ethylene sulfite, ethyl ethylene sulfite, 4,5-dimethyl ethylene sulfite, 4,5-diethyl ethylene sulfite, propylene sulfite, 4,5-dimethyl propylene sulfite phite, 4,5-diethyl propylene sulfite, 4,6-dimethyl propylene sulfite, 4,6-diethyl propylene sulfite, 1,3-butylene glycol sulfite, and the like, examples of the saturated sultone may include 1,3-propane sultone, 1,4-butane sultone, and the like, examples of the unsaturated sultone may include ethene sultone, 1,3-propene sultone, 1,4-butene sultone, 1-methyl-1,3-propene sultone, and the like, and examples of the acyclic sulfone may include divinyl sulfone, dimethyl sulfone, diethyl sulfone, methylethyl sulfone, methylvinyl sulfone, and the like.

The above additives are added to the electrolyte to improve low-temperature output characteristics by firmly forming an SEI film on the negative electrode, suppress decomposition of the surface of the positive electrode that may occur during high-temperature cycle operation, and prevent oxidation of the electrolyte.

When the battery case is a pouch type battery case, an aluminum laminated pouch including an aluminum layer may be used. After the electrolyte is injected, an open portion of the aluminum laminated pouch may be sealed by heat welding or heat sealing.

FIG. 2 is a flowchart of a method of activating a secondary battery according to an embodiment of the present invention. Referring to FIG. 2, the method of activating the secondary battery according to the present invention further includes, after the pre-aging operation S300 is performed, a first charging operation S400 of charging the pre-aged secondary battery, and an aging operation S500 of aging the first charged secondary battery.

<First Charging Operation>

The first charging operation S400 is an operation of charging the pre-aged secondary battery until a charging depth of the pre-aged secondary battery reaches a predetermined charging depth. Through the first charging operation, the secondary battery may be activated.

In the first charging operation, the secondary battery does not need to be fully charged, and specifically, the charging depth in the first charging operation may be 75% or less of the battery design capacity (SOC 100%), 15 to 70%, or 30 to 60%. However, it is possible to sufficiently stably form an SEI film and induce initial gas generation even within the above range. The set numerical value of the charging depth is not limited thereto, and the charging depth may be appropriately changed according to the purpose of the activation process.

As the charging conditions of the first charging operation, the charging may be performed according to the conditions known in the art.

In one specific example, in the first charging operation, the charging may be performed at a charging termination voltage of 2.5 to 4.0 V and a C-rate of 1.0 C or less. However, such a charging termination voltage may vary according to the characteristics of the battery such as the capacity of the battery, the material of the battery, and the like. Further the first charging may be performed under the temperature conditions of ° C. to 30° C., specifically, 22° C. to 28° C., and more specifically, 23° C. to 27° C.

Further the first charging operation may be performed while the secondary battery is pressurized. In the case in which the secondary battery is first charged while being pressurized, It is Possible to Suppress Internal Gas from being Trapped Inside the Electrode. <Aging Operation>

In order to stabilize the battery which is first charged according to the above method or to accelerate the stabilization of the SEI film formed through first charging, an aging operation S500 of aging the secondary battery under various conditions is performed.

In the aging operation, a room temperature aging process of aging the secondary battery for a determined period of time under room temperature/atmospheric pressure conditions may be performed, and depending on the purpose, a high temperature aging process may be performed instead of the room temperature aging process, or both of the room temperature aging process and the high temperature aging process may be performed. The high temperature aging process is a process of aging a battery in a high-temperature environment and may accelerate the stabilization of an SEI film, and the high temperature aging process and the room temperature aging process may be sequentially performed on the first charged battery.

In one specific example, the high temperature aging process may be performed at a temperature of 50° C. to 100° C. and preferably 50° C. to 80° C. The high temperature aging process may be performed for 1 to 30 hours and preferably 2 hours to 24 hours.

In one specific example, the room temperature aging process may be performed at a temperature of 20° C. to 30° C., specifically, 22° C. to 28° C., more specifically, 23° C. to 27° C., and furthermore specifically, 25° C. to 27° C. The room temperature aging process may be performed for 12 to 120 hours or 18 to 72 hours.

FIG. 3 is a flowchart of a method of activating a secondary battery according to an embodiment of the present invention. Referring to FIG. 3, a full-discharging and full-charging operation S600 of fully discharging the secondary battery to near SOC 0% and then charging the secondary battery to 95% (SOC 95%) or more of the discharged secondary battery's design capacity may be further performed. The full-discharging and full-charging operation may be performed one time or may be repeated two or more times.

In one specific example, as shown in FIG. 5, the method of activating the secondary battery according to the present invention may further include, after the full-discharging and full-charging operation S600 is performed, an additional aging operation S700. The additional aging operation is a process of stabilizing the secondary battery and may be performed at room temperature or a high temperature, and specifically, may be performed for 1 day to 21 days. The additional aging operation may include a monitoring (open-circuit voltage (OCV) tracking) process including a process of measuring an OCV of a battery at regular time intervals in order to select a low-voltage defective battery in which voltage drops occur within a range exceeding the self-discharge of the battery.

The method of activating the secondary battery of the present invention may further include a degassing operation of discharging the gas inside the secondary battery to the outside as necessary. The gas is generated inside the secondary battery by a reaction between the electrolyte and the electrode while the first charging operation and the aging operation are performed, and the degassing operation may be performed to discharge the internal gas to the outside of the battery. In this case, the degassing operation may be performed simultaneously with the aging operation, or may be performed after the aging operation is performed.

Hereinafter, the present invention will be described in more detail with reference to examples. However, since the configurations described in the embodiments described in this specification of the present invention are only exemplary embodiments and do not represent the overall technological scope of the present invention, it is understood that the present invention covers various equivalents, modifications, and substitutions at the time of filing of this application.

Manufacturing Example 100 parts by weight of NCM ($Li[Ni_{0.8}Co_{0.1}Mn_{0.1}]O_2$) serving as a positive electrode active material, 1.5 parts by weight of carbon black (FX35, Denka) serving as a conductive material, and 2.3 parts by weight of polyvinylidene fluoride (KF9700, Kureha) serving as a binder polymer were added to NMP(N-methyl-2-pyrrolidone) serving as a solvent to prepare a positive electrode active material slurry. Both side surfaces of aluminum foil were coated with the positive electrode active material slurry in a loading amount of 640 mg/25 $cm^2$, and then were vacuum-dried to obtain a positive electrode.

100 parts by weight of artificial graphite (GT, Zichen (China)) serving as a negative electrode active material, and 1.1 parts by weight of carbon black (Super-P), 2.2 parts by weight of styrene-butadiene rubber, and 0.7 parts by weight of carboxymethyl cellulose carboxymethyl cellulose serving as conductive materials were added to water serving as a solvent to prepare a negative electrode active material slurry, and then copper foil was coated with the negative electrode active material slurry, dried, and pressed to manufacture a negative electrode.

Meanwhile, after a polyethylene separator having a microporous structure in which an inorganic layer was introduced was prepared, the polyethylene separator was interposed between the positive electrode and the negative electrode to manufacture an electrode assembly, the electrode assembly was embedded in a pouch-type battery case, and then an electrolyte containing 1M $LiPF_6$ and 1 wt % of additive B serving as an electrolyte additive was injected in an organic solvent in which EC and EMC were mixed in a composition of 3:7 (volume ratio) to complete the manufacturing of the battery.

EXAMPLE

A graph that is obtained by performing charging on the battery in the manufacturing example at room temperature (within a driving voltage range of 1.0 to 2.7 V at temperature of 23° C., under a charging condition of 0.1 C-rate) up to SOC 40% and differentiating a voltage-capacity profile obtained by observing a change in capacity according to voltage is shown in FIG. 4. Referring to FIG. 4, it can be seen that the onset point of the reduction reaction of the additive B is present at a voltage of about 1.5 V.

At a time point at which 30 minutes have elapsed from the injection of the electrolyte of the battery in the manufacturing example, at a temperature of 23° C., a charging termination voltage was set to 1.4 V, and pre-charging was performed on the battery in the manufacturing example in a constant current manner at a charging rate of 0.1 C-rate. Thereafter, at a temperature of 23° C., the pre-charged battery was aged for 48 hours under atmospheric pressure condition to complete the pre-aging process.

The first charging was completed by charging the pre-aged battery at a C-rate of 0.2 C up to 65% of the cell design capacity (SOC 65%). A high temperature aging process was performed on the first charged battery a for 24 hours at a temperature of 60° C., and then a room temperature aging process was performed for 4 days at a temperature of 25° C. Thereafter, a full-discharging and full-charging process was performed to perform the activation process of the secondary battery.

Comparative Example 1

An activation process was performed in the same manner as in Example 1, except that the operation of deriving the reduction reaction voltage of the additive and the pre-charging operation in Example 1 above were omitted.

Comparative Example 2

An activation process was performed in the same manner as in Example 1, except that the charging termination voltage of the pre-charging operation in Example 1 above was set to 2.0 V.

Experimental Example 1: Voltage drop amount after high temperature storage For each of the secondary batteries manufactured in the example and the comparative examples, the secondary batteries were fully charged (SOC 100%) up to 4.2 V, 50 mA cut off under constant current/constant voltage conditions at 0.33 C-rate at 25° C., and then an initial voltage V1 before storage was measured using a PNE-0506 charger (manufacturer: Pne Solution Co., Ltd.). Then, a voltage V2 after storage was measured for 1 month at a temperature of 60° C. using the above charger and discharger, and an amount of the voltage drop is shown in Table 1.

Experimental Example 2: Capacity Retention Rate After 100 Cycles

Each of the secondary batteries manufactured in the example and the comparative examples was charged at a constant current/constant voltage up to 4.35 V at a C-rate of 0.8 C, charged at 0.05 C cut off, and discharged at 0.5 C and 3.0 V. Then, constant current/constant voltage condition charging up to 4.35 V at 0.8 C rate and 0.05 C cut-off charging, and discharging at 0.5 C 3.0 V at room temperature were set as one cycle, and a cycle capacity retention rate after 100 cycles is shown in Table 1 below as a percentage compared to the capacity of one cycle.

TABLE 1

|   | Voltage drops amount (mV) after storage at 60° C. for 1 month | 100 cycles capacity retention rate (%) |
|---|---|---|
| Example | 150 | 98.2 |
| Comparative Example 1 | 320 | 97.8 |
| Comparative Example 2 | 168 | 90.1 |

Referring to Table 1, in Comparative Example 1 in which a pre-charging operation is not performed, a voltage drop amount after storage for one month was much larger than that of the battery of Example, which is because the battery of Example 1 went through the pre-charging operation, and thus it is interpreted as an effect of preventing the elution of foreign substances or metals.

Meanwhile, although the battery in Comparative Example 2 went through the pre-charging operation, a charging termination voltage was set to a voltage exceeding a voltage at which a reductive decomposition reaction of an electrolyte additive occurs in the pre-charging operation, and thus it is interpreted that the reduction decomposition reaction of the additive occurred before sufficiently wetting with the electrolyte, and the capacity retention rate was poor compared to the battery of Example due to the non-uniform SEI film formation.

As described above, the method of activating the secondary battery of the present invention is effective in preventing low voltage failure and uniformly forming the SEI film by lowering the potential of the negative electrode while suppressing the negative electrode reaction of the electrolyte additive.

The invention claimed is:

1. A method of activating a secondary battery, comprising:
an operation of deriving a reduction reaction voltage according to an electrolyte additive;
a pre-charging operation of pre-charging the secondary battery into which an electrolyte containing the electrolyte additive is injected; and
a pre-aging operation of wetting an electrode assembly accommodated in the secondary battery with the injected electrolyte and aging the electrode assembly to provide a pre-aged secondary battery,
wherein a charging termination voltage in the pre-charging operation is less than the reduction reaction voltage.

2. The method of claim 1, wherein the reduction reaction voltage is a voltage at an onset point at which a reduction reaction starts in a dQ/dV graph obtained by differentiating a voltage-capacity profile during first charging of the secondary battery into which the electrolyte containing the electrolyte additive is injected.

3. The method of claim 2, wherein the charging termination voltage in the pre-charging operation is set within a range of 70% to 99% of the reduction reaction voltage.

4. The method of claim 1, wherein the pre-charging operation starts within 3 hours after the injection of the electrolyte.

5. The method of claim 1, wherein the pre-charging operation is performed using a constant current charging method.

6. The method of claim 5, wherein, in the pre-charging operation, the secondary battery is charged at a C-rate of 0.01 to 0.5.

7. The method of claim 1, further comprising, after the pre-aging operation is performed:
a first charging operation of charging the pre-aged secondary battery to provide a first charged secondary battery; and
an aging operation of aging the first charged secondary battery to provide an aged, first charged secondary battery.

8. The method of claim 7, wherein, in the first charging operation, the pre-aged secondary battery is charged while being pressurized.

9. The method of claim 7, further comprising, after the aging operation, a full-discharging and full-charging operation of fully discharging and fully charging the aged, first charged secondary battery.

10. The method of claim 7, further comprising, after the full-discharging and full-charging operation is performed, an additional aging operation of aging the aged, first charged secondary battery.

* * * * *